(12) United States Patent
Zhang et al.

(10) Patent No.: US 11,630,341 B2
(45) Date of Patent: Apr. 18, 2023

(54) DISPLAY PANEL, TOUCH DISPLAY PANEL, AND DISPLAY DEVICE

(71) Applicants: Beijing BOE Display Technology Co., Ltd., Beijing (CN); BOE Technology Group Co., Ltd., Beijing (CN)

(72) Inventors: Yu Zhang, Beijing (CN); Miao Liu, Beijing (CN); Shixin Geng, Beijing (CN); Bochang Wang, Beijing (CN); Zhanchang Bu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/526,715

(22) Filed: Nov. 15, 2021

(65) Prior Publication Data

US 2022/0269127 A1 Aug. 25, 2022

(30) Foreign Application Priority Data

Feb. 24, 2021 (CN) .......................... 202110209975.5

(51) Int. Cl.
| | | |
|---|---|---|
| *G02F 1/1335* | (2006.01) | |
| *G02F 1/1333* | (2006.01) | |
| *G02F 1/13357* | (2006.01) | |
| *G06F 3/041* | (2006.01) | |

(52) U.S. Cl.
CPC .... *G02F 1/133531* (2021.01); *G02F 1/13338* (2013.01); *G02F 1/133606* (2013.01); *G06F 3/0412* (2013.01)

(58) Field of Classification Search
CPC ........... G02F 1/133531; G02F 1/13338; G02F 1/133606; G06F 3/0412
USPC ...................................................... 349/96–98
See application file for complete search history.

(56) References Cited

U.S. PATENT DOCUMENTS

| | | | | |
|---|---|---|---|---|
| 2010/0238383 | A1* | 9/2010 | Nakano ................ | G02B 5/3033 156/247 |
| 2017/0343854 | A1* | 11/2017 | Koyama ................. | G06F 3/044 |
| 2018/0088268 | A1* | 3/2018 | Kondo ..................... | C03C 3/083 |
| 2020/0335729 | A1 | 10/2020 | Wu et al. | |
| 2021/0048925 | A1* | 2/2021 | Wang .................... | G06F 3/0446 |

FOREIGN PATENT DOCUMENTS

CN 110277020 A 9/2019

OTHER PUBLICATIONS

CN 2021204177129 first office action, dated Aug. 16, 2021.

* cited by examiner

*Primary Examiner* — Charles S Chang
(74) *Attorney, Agent, or Firm* — IPRO, PLLC

(57) ABSTRACT

A display panel, a touch display panel, and a display device are provided. The touch display panel includes a first polarizer, a liquid crystal cell, and a backlight assembly, wherein a pencil hardness of the first polarizer is not less than 3H and not greater than 9H; the first polarizer is arranged at a side of the liquid crystal cell distal to the backlight assembly.

7 Claims, 3 Drawing Sheets

DISPLAY PANEL, TOUCH DISPLAY PANEL, AND DISPLAY DEVICE

CROSS-REFERENCE TO RELATED APPLICATIONS

The present disclosure claims priority to Chinese Patent Application No. 202110209975.5 filed in China on Feb. 24, 2021, the entire contents of which are hereby incorporated by reference.

TECHNICAL FIELD

The present disclosure relates to the technical field of displays, and in particularly relates to a display panel, a touch display panel, and a display device.

BACKGROUND

In display products of the related art, an outer surface of the display panel is generally in a bare state, which is very vulnerable to scratches caused by scraping and affects display effects, and the display device inside the display panel is relatively fragile, and is vulnerable to breakage and other damages due to external force.

In the related art, the touch display product is obtained by providing a display panel with a touch panel, and the process of touching will bring more stress and scratches to the display panel of a touch display product, and therefore a cover plate needs to be added to an outermost layer of the touch display product to provide sufficient protection against scratches to the display panel so as to prevent the display element in the display panel from being damaged by scratches; the display panel is also provided with sufficient strength to prevent the display panel from being damaged by bending or even breaking.

SUMMARY

The present disclosure proposes a display panel, a touch display panel, and a display device.

In a first aspect, embodiments of the present disclosure provide a display panel, which includes: a first polarizer, a liquid crystal cell, and a backlight assembly, wherein a pencil hardness of the first polarizer is not less than 3H and not greater than 9H;

the first polarizer is arranged at a side of the liquid crystal cell distal to the backlight assembly.

In a second aspect, embodiments of the present disclosure provide the touch display panel which includes: a touch panel and the display panel as provided in the first aspect;

the touch panel is arranged at a side of the first polarizer distal to the backlight assembly.

In a third aspect, embodiments of the present disclosure provide the touch display panel, which includes: the touch panel, and the display panel provided in the first aspect;

the touch panel is arranged between a cathode layer and the first polarizer in the display panel.

In a fourth aspect, embodiments of the present disclosure provide the display device which includes: the display panel as provided in the first aspect or the touch display panel as provided in the second aspect or the third aspect.

Additional aspects and advantages of the disclosure will be partially presented in the following descriptions and partially become apparent from the following descriptions or be understood by implementing the present disclosure.

BRIEF DESCRIPTION OF THE DRAWINGS

The foregoing and/or additional aspects and advantages of the present disclosure will become apparent and readily appreciated from the following description of embodiments in conjunction with the accompanying drawings, in which.

DETAILED DESCRIPTION

Figure 1:
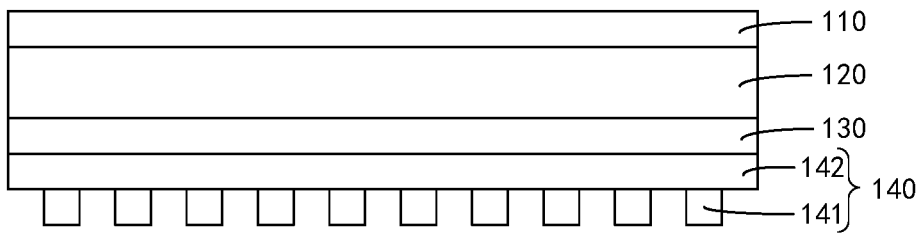
FIG. 1 is a schematic structural diagram of an implementation of a display panel according to an embodiment of the present disclosure.

Description will now be made in detail to the present disclosure, examples of the embodiments of the present disclosure are illustrated in the accompanying drawings, wherein the same or similar reference numerals refer to the same or similar parts or parts having the same or similar functions throughout. Furthermore, if a detailed description of known technology is not necessary for illustrating the features of the present disclosure, it is omitted. The embodiments described below with reference to the drawings are exemplary and intended to explain the disclosure and should not be explained as limits to the disclosure.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the related art and will not be interpreted in an idealized or overly formal sense unless expressly so defined herein.

As used herein, the singular forms "a", "an", "the" and "this" may include the plural forms as well, unless expressly stated otherwise. It should be further understood that the terms "includes" and/or "including" when used in the specification of the present disclosure, specify the presence of the features, integers, steps, operations, elements, and/or components, but do not preclude the presence or addition of one or more other features, integers, steps, operations, elements, components, and/or groups thereof. It should be understood that when an element is referred to as being "connected" or "coupled" to another element, it can be directly connected or coupled to the other element, or intervening elements may also be present. Furthermore, "connected" or "coupled" as used herein can include wirelessly connected or wirelessly coupled. As used herein, the term "and/or" includes all or any one of one or more associated listed items and all combinations thereof. The present disclosure will first be described and explained with respect to several terms.

Pencil hardness: also referred to as a coating film hardness pencil test, which is a test method and measurement system for calibrating the hardness of a coating film. According to industry standards, the hardness of a pencil lead gradually decreases from a hardest 9H through 5H, 4H, 3H, 2H, H, through HB with moderate hardness, and then to B, 2B, . . . etc., wherein H represents hardness and B represents black. The darkness of the color is related to the graphite content, the darker the color, the higher the graphite content, and the softer the pencil. The pencil hardness is a scientific hardness system defined by a strict hardness value. In a coating industry, this series of pencils with different hardness are used to examine the hardness of the coating film, and the test result obtained is referred to as the pencil hardness of the coating film.

Gpa: units of pressure, i.e., 10 to the power of 9 Pascals.

In addition, in general, for the touch display device, the larger the size of the touch panel, the thicker the thickness of a cover plate.

However, in related art, the touch display panel having the cover plate has the following disadvantages.

1. The cover plate and a lower display device in the touch display panel are often fully adhered with optical adhesive or adhered with a frame sticker, wherein yellowing of the optical adhesive and uneven adhesion stress would easily lead to a defect such as adhesion light leakage, etc.; in addition, the cost of the cover plate surface treatment process is also high.

2. The structure of the cover plate is heavy, and the thickness is generally about 2-10 mm, which seriously hinders the development of the light and thin touch display products and makes it difficult to improve user experiences.

3. Due to the thickness and refractive index of the cover plate, there is a problem of dislocation between an actual display position and a visual sense position, which adversely affects the user experience of a display product, and there is dislocation between a touch point and a display point, which seriously affects touch accuracy.

The present disclosure provides the display panel, the touch display panel, and the display device, so as to solve the above technical problems of the related art.

The technical solutions of the present disclosure and how the technical solutions of the present disclosure solve the above-mentioned technical problems are described in detail in the following specific embodiments.

Figure 2:
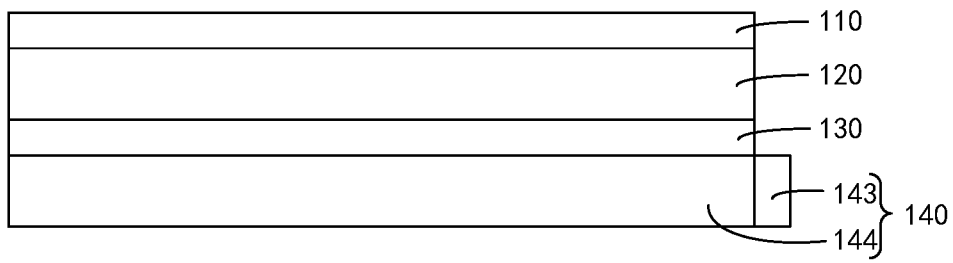
FIG. 2 is a schematic structural diagram of another implementation of a display panel according to an embodiment of the present disclosure.
Figure 3:
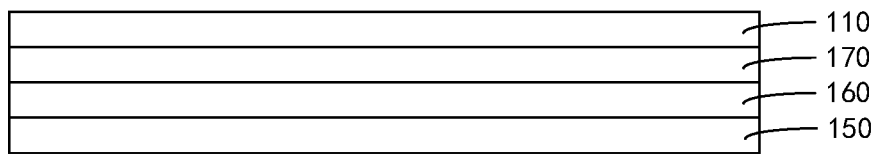
FIG. 3 is a schematic structural diagram of yet another implementation of a display panel according to an embodiment of the present disclosure.

The embodiment of the present disclosure provides a display panel 100, a structural schematic view of which is shown in FIGS. 1-3, which includes: a first polarizer 110 having a pencil hardness of being not less than 3H and not more than 9H.

The first polarizer 110 is arranged at the light-emitting side of the display panel 100.

In the present embodiment, the first polarizer 110 arranged at the light-emitting side of the display panel 100 is made of a material with a pencil hardness of being not less than 3H and not greater than 9H, and has relatively excellent mechanical properties, so that the first polarizer 110 can provide the display panel 100 with sufficient anti-scratch protection to prevent the display element in the display panel 100 from being damaged by scratches, and the first polarizer 110 can also provide the display panel 100 with a certain strength of support to reduce the probability of the display panel 100 being damaged by bending or even breaking, which can effectively extend the service life of the display panel.

Optionally, the material of the first polarizer 110 includes polyurethane.

Optionally, the material for the first polarizer 110 can be obtained by coating or spraying a resin material with silica and curing the resin material, or by coating or spraying the resin material with the polyurethane coating and curing the resin material.

The inventors of the present disclosure have considered that the display panel 100 can adopt a display structure of an LCD (Liquid Crystal Display). To this end, the present disclosure provides one possible implementation for the display panel 100 as follows:

as shown in FIGS. 1 and 2, the display panel 100 of the embodiment of the present disclosure further includes: a backlight assembly 140, a second polarizer 130, and a liquid crystal cell 120 arranged sequentially in that order in a direction approaching the first polarizer 110.

The first polarizer 110 is arranged at a side of the liquid crystal cell 120 distal to the backlight assembly 140.

In the present embodiment, the first polarizer 110 is arranged at the side of the liquid crystal cell 120 distal to the backlight assembly 140, namely, the first polarizer 110 is arranged at the light-emitting side of the liquid crystal display structure, and since the pencil hardness of the first polarizer 110 is not less than 3H and not greater than 9H, the first polarizer 110 can provide protection for display devices such as the liquid crystal cell 120 and the second polarizer 130.

Figure 9:
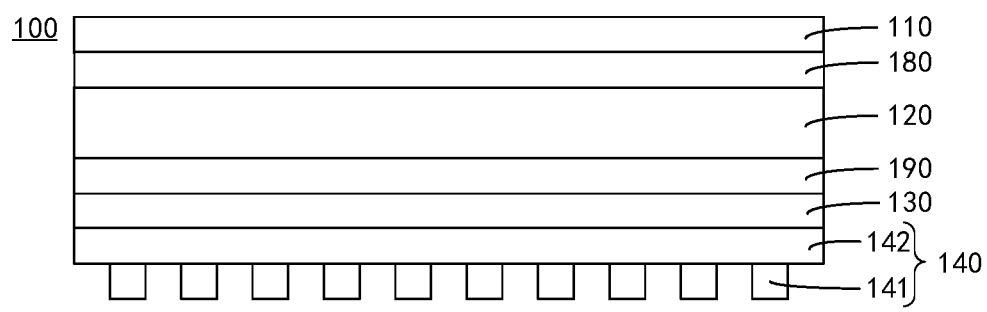
FIG. 9 is a schematic structural diagram of yet another implementation of a display panel according to an embodiment of the present disclosure.

Optionally, as shown in FIG. 9, the display panel 100 can further include: a color filter 180 and an array substrate 190. The color filter 180 is arranged between the liquid crystal cell 120 and the first polarizer 110, and the array substrate 190 is arranged between the second polarizer 130 and the liquid crystal cell 120.

Based on the display panel 100 adopting the LCD display structure provided in the above-described embodiments, the inventors of the present disclosure have considered that the backlight assembly 140 in the liquid crystal display structure can employ the structure of the first light source 141 for bottom emitting. To this end, the present disclosure provides one possible implementation for the backlight assembly 140 as follows As shown in FIG. 1, the backlight assembly 140 includes: a first light source 141 and a diffusion plate 142, wherein the diffusion plate 142 is arranged at the side of the second polarizer distal to the liquid crystal cell 120;

the first light source 141 is arranged at the side of the diffusion plate 142 distal to the second polarizer 130; and the elastic modulus of the diffusion plate 142 is not less than 68 GPa.

In the present embodiment, the diffusion plate 142 is made of the material with the elastic modulus of not less than 68 GPa, so that the diffusion plate 142 has a certain strength and can provide a certain strength support for the whole display panel 100, thereby reducing the probability of the display panel 100 being damaged by bending or even breaking.

Optionally, the diffusion plate 142 is made of the material having the light transmittance of not less than 90%, the density of not less than 2.0 g/cm³, and an elastic modulus of not less than 55 GPa, which may be, e.g., glass or sapphire.

Based on the display panel 100 adopting the LCD display structure provided in the above-described embodiments, the inventors of the present disclosure have considered that the backlight assembly 140 in the liquid crystal display structure can employ the structure of the first light source 141 for side-entering light. To this end, the present disclosure provides a possible implementation for the backlight assembly 140 as follows.

As shown in FIG. 2, the backlight assembly 140 includes: a second light source 143 and a light guide plate 144, wherein the second light source 143 is arranged at an end of the light guide plate 144;

the light guide plate 144 is arranged at the side of the second polarizer 130 distal to the liquid crystal cell 120; and the light guide plate 144 has an elastic modulus of not less than 68 GPa.

In the present embodiment, the light guide plate 144 is made of the material with the elastic modulus of not less than 68 GPa, so that the light guide plate 144 has the certain strength, and can provide the certain strength support for the whole display panel 100, so as to reduce the probability of the display panel 100 being damaged by bending or even breaking.

Optionally, the light guide plate 144 is made of the material having the light transmittance of not less than 90%, the density of not less than 2.0 g/cm³, and the elastic modulus of not less than 55 GPa, which may be, e.g., the glass or the sapphire.

The inventors of the present disclosure consider that the display panel 100 can employ the display structure such as the LED (Light-Emitting Diode) or the Micro-LED (Micro Light-Emitting Diode) or an OLED (Organic Light-Emitting Diode). To this end, the present disclosure provides one possible implementation for the display panel 100 as follows.

As shown in FIG. 3, the display panel 100 of the embodiment of the present disclosure further includes: an anode layer 150, a light-emitting layer 160, and a cathode layer 170 that are laminated one on another in that order in a direction approaching the first polarizer 110.

The first polarizer 110 is arranged at the side of the cathode layer 170 distal to the light-emitting layer 160.

In the present embodiment, the first polarizer 110 is arranged at a side of the cathode layer 170 distal to the light-emitting layer 160, namely, the first polarizer 110 is arranged at the light-emitting side of the display structure such as the LED or the Micro-LED or the OLED, and since the pencil hardness of the first polarizer 110 is not less than 3H and not greater than 9H, the first polarizer 110 can provide protection for the display device such as the cathode layer 170, the light-emitting layer 160, and the anode layer 150.

Figure 4:
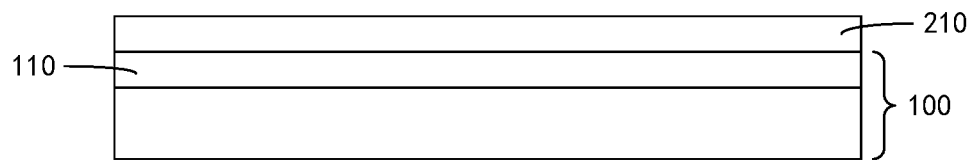
FIG. 4 is a schematic structural diagram of an implementation of a touch display panel according to an embodiment of the present disclosure.

Based on the same inventive concept, the embodiment of the present disclosure provides a touch display panel 200, a structural schematic diagram of which is shown in FIG. 4, which includes: a touch panel 210, and any one of the display panels 100 as provided in the previous embodiments. The touch panel 210 is arranged at the light-emitting side of the first polarizer 110 in the display panel 100.

In the present embodiment, the first polarizer 110 having a pencil hardness of being not less than 3H and not greater than 9H is used on the light-emitting side of the structure of the display panel 100 in the touch display panel 200, so that the first polarizer 110 can provide the display panel 100 with sufficient protection against scratches to prevent the display element in the display panel 100 from being damaged by scratches, and the first polarizer 110 can also provide the display panel 100 with the certain strength of support to reduce the probability of the display panel 100 being damaged by bending or even breaking.

With the help of the first polarizer 110, the display panel 100 is beneficial to realize a structure without a conventional cover plate, and in this way, the cover plate structure can be omitted, thereby promoting the development of light and thin touch display products, and enabling a display image to be displayed at a location closer to the surface of the touch display product, facilitating the reduction or elimination of the dislocation between the actual display position and the visual sensory position, and further facilitating the reduction or elimination of the dislocation between the touch point and the display point, so as to improve the touch accuracy; it is also possible to eliminate the bonding process between the cover plate and the display device or the touch device, to avoid the problem of light leakage during bonding and to save the bonding cost.

Optionally, the display panel 100 can adopt the LCD display structure, the LED or Micro-LED or OLED display structure, etc.

The inventors of the present disclosure consider that the display panel 100 in the touch display panel 200 can employ the LCD display structure. To this end, the present disclosure provides one possible implementation for the touch display panel 200 as follows.

Figure 5:
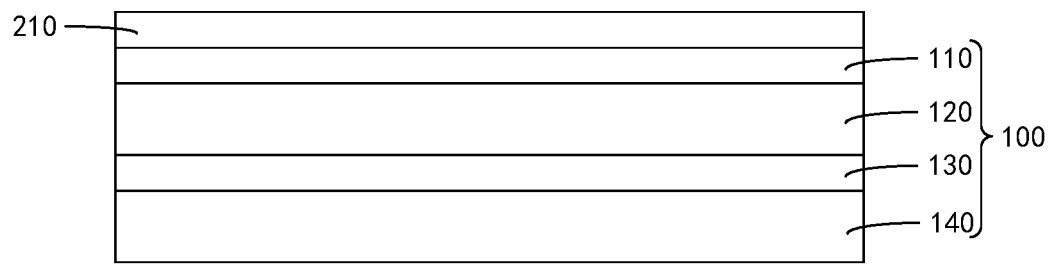
FIG. 5 is a schematic structural diagram of another implementation of a touch display panel according to an embodiment of the present disclosure.
Figure 6:
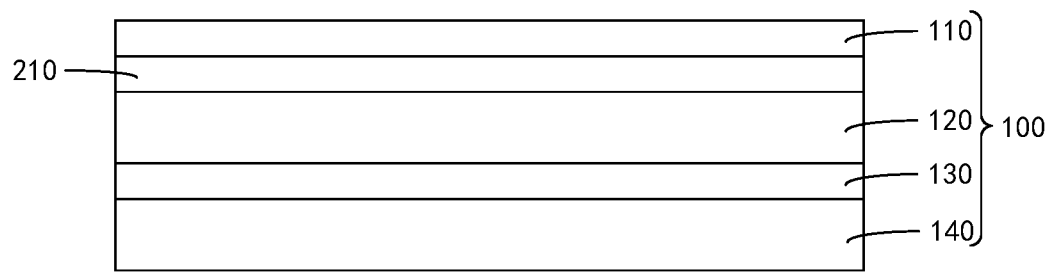
FIG. 6 is a schematic structural diagram of yet another implementation of a touch display panel according to an embodiment of the present disclosure.
Figure 7:
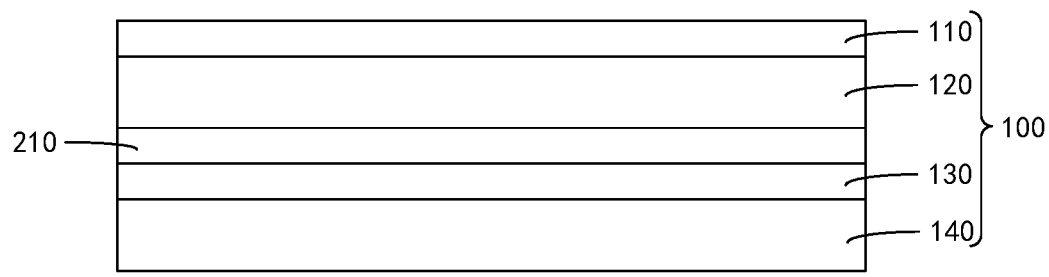
FIG. 7 is a schematic structural diagram of yet another implementation of a touch display panel according to an embodiment of the present disclosure.

As shown in FIGS. 5-7, the touch display panel 200 of the embodiment of the present disclosure includes: the touch panel 210 and the display panel 100 which employs the LCD display structure provided in the foregoing embodiments. The touch panel 210 is arranged at the light-emitting side of the backlight assembly 140 in the display panel 100.

Optionally, the touch panel 210 includes any one structure of an infrared type, a resistive type, a surface acoustic wave type, and a capacitive type.

In some possible embodiments, as shown in FIG. 5, the touch panel 210 is located at the side of the first polarizer 110 distal to the backlight assembly 140 in the display panel 100.

In the present embodiment, the touch panel 210 is arranged at the light-emitting side of the first polarizer 110 in the display panel 100, namely, the touch panel 210 is located outside the display panel 100 adopting an LCD display structure, and it can be advantageous for the touch panel 210 to adopt a capacitive touch structure. A capacitive touch structure has the characteristics of adapting to a large size and mature technology, providing more manufacturers with driving circuits, and being compatible with active touch pens.

In some possible embodiments, as shown in FIG. 6, the touch panel 210 is located between the liquid crystal cell 120 and the first polarizer 110 in the display panel 100.

In the present embodiment, the touch panel 210 is arranged between the liquid crystal cell 120 and the first polarizer 110 in the display panel 100, that is, the touch panel 210 is located inside the display panel 100 adopting the LCD display structure, and is arranged at the light-emitting side of the liquid crystal cell 120. In this way, the touch panel 210 does not need to be attached, facilitating the realization of an ultra-thin touch display product structure.

In some possible embodiments, as shown in FIG. 7, the touch panel 210 is located between the second polarizer 130 and the liquid crystal cell 120 in the display panel 100.

In the present embodiment, the touch panel 210 is arranged between the second polarizer 130 and the liquid crystal cell 120 in the display panel 100, that is, the touch panel 210 is located inside the display panel 100 adopting the LCD display structure, and is arranged at the light incident side of the liquid crystal cell 120. In this way, the touch panel 210 does not need to be attached, facilitating the realization of an ultra-thin touch display product structure.

It can be understood that when the display panel 100 in the touch display panel 200 can adopt the LCD display structure, the touch display panel can be enhanced in following two ways.

If the backlight assembly 140 can adopt the structure of the first light source 141 for bottom emitting, and the diffusion plate 142 uses the material with the elastic modulus of not less than 68 GPa, so that the diffusion plate 142 has the certain strength, the whole display panel 100 can be provided with the certain strength support, and the probability of the display panel 100 is damaged such as bending or even breaking can be reduced, which can make up for the decreasing in strength caused by eliminating the conventional cover plate.

If the backlight assembly 140 uses a structure of a first light source 141 for side emitting, the light guide plate 144 can use a material with an elastic modulus of not less than 68 GPa, so that the light guide plate 144 has a certain strength, and can provide a certain strength support for the whole touch display panel 200, so as to reduce the probability of the display panel 100 being damaged by bending or even breaking, and can make up for the decreasing in strength caused by eliminating the conventional cover plate.

The inventors of the present disclosure consider that the display panel 100 in the touch display panel 200 can employ the display structure such as the LED or the Micro-LED or the OLED. To this end, the present disclosure provides one possible implementation for the touch display panel 200 as follows.

Figure 8:
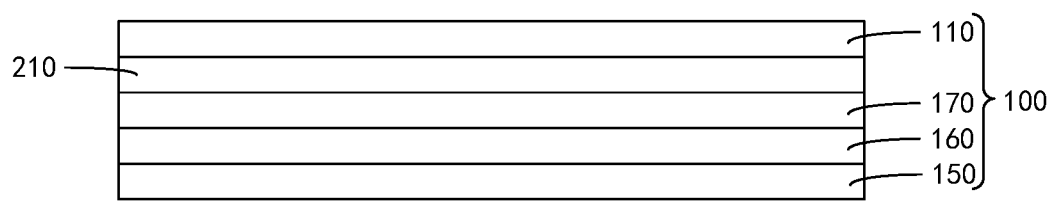
FIG. 8 is a schematic structural diagram of yet another implementation of a touch display panel according to an embodiment of the present disclosure.

As shown in FIG. 8, the touch display panel 200 of the embodiment of the present disclosure includes: the touch panel 210, and the display panel 100 using the LED or the Micro-LED or the OLED display structure provided in the previous embodiments. The touch panel 210 is arranged between the cathode layer 170 and the first polarizer 110 in the display panel 100.

In the present embodiment, the touch panel 210 is arranged between the cathode layer 170 and the first polarizer 110 in the display panel 100, namely, the touch panel 210 is located inside the display panel 100 using the LED or the Micro-LED or the OLED display structure, and since the pencil hardness of the first polarizer 110 is not less than 3H and not greater than 9H, the first polarizer 110 can not only provide protection for display devices such as the cathode layer 170, the light-emitting layer 160 and the anode layer 150, but also provide protection for the touch panel 210.

It will be appreciated that in some possible embodiments, the touch panel 210 can also be arranged at the side of the first polarizer 110 distal to the cathode layer 170. That is, the touch panel 210 is located outside the display panel 100 employing the LED or the Micro-LED or the OLED display structure.

Figure 10:
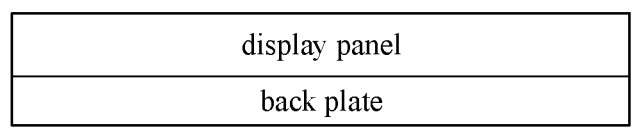
FIG. 10 is a schematic diagram of a display device according to an embodiment of the present disclosure.

Based on the same inventive concept, as shown in FIG. 10, the embodiment of the present disclosure provides the display device which includes: any one of the display panels (such as the display panel 100 or the touch display panel 200) as provided in the previous embodiments, and a back plate.

The display device can be at least one of any product (or component) having the display function (or the touch display function) such as an electronic whiteboard, a television, a digital photo frame, a mobile phone, a smart watch, a tablet computer, etc.

In the present embodiment, since the display device adopts any one of the display panels 100 provided in the above-mentioned embodiments or any one of the touch panels provided in the above-mentioned embodiments, the principles and technical effects thereof may refer to the above-mentioned embodiments and will not be described in detail herein.

In the following, a specific example of the backlight structure for bottom emitting and a specific example of the backlight structure for side emitting will be described for the display panel using the LCD display structure.

Case 1: an LCD display panel using the bottom emitting backlight structure replaces the conventional PS (Polystyrene Plastic) or PC (Polycarbonate) diffusion plate with a glass diffusion plate. The glass diffusion plate is of a density of 2.4 g/cm$^3$, and elastic modulus>68 GPa; the PS diffusion plate is of a density of 1.04-1.9 g/cm$^3$, and elastic modulus of 3-3.5 GPa; the PC diffusion plate is of a density of 1.18-1.22 g/cm$^3$, and elastic modulus of 2.32 GPa. As can be seen from a comparison of material properties, the glass diffusion plate is denser and therefore heavier than the conventional PS or PC diffusion plate.

Effectiveness on weight reduction: weight of cover plate (length×width×thickness×2.4 g/cm$^3$)+weight of PC or PS diffusion plate (length×width×thickness×1.9 g/cm$^3$ or 1.22 g/cm$^3$)−weight of glass diffusion plate (length×width×thickness×2.4 g/cm$^3$). Taking 65 inches as an example, when the thickness of the cover plate is 7 mm and the thickness of the PS material of the diffusion plate is 2 mm, for the calculation convenience, the lengths and widths of the cover plate and the diffusion plate are set to be the same, the weight is reduced by (the weight of the cover plate+the weight of the PS diffusion plate−the weight of the glass diffusion plate)/(the weight of the cover plate+the weight of the PS diffusion plate)=1.58×the length×the width/2.06×the length×the width=76.7%, or the weight of the new structure is 23.3% of the weight of the conventional structure.

The conventional design includes both the glass cover plate and the PS diffusion plate, the new structure does not include the glass cover plate and includes only the glass diffusion plate, so the weight is reduced by (the conventional structure weight−the new structure weight)/the conventional structure weight. The weight of the diffusion plate is not changed.

Case 2: an LCD display panel using a side-emitting backlight structure replaces a conventional light guide plate made of MS (polyacrylate) or PMMA (polymethyl methacrylate) with a glass light guide plate. The glass light guide plate is of a density of 2.4 g/cm$^3$, and elastic modulus>68 GPa; the MS light guide plate is of a density of 1.13 g/cm$^3$, and elastic modulus of 1.32-1.42 GPa; the PMMA light guide plate is of a density of 1.18 g/cm$^3$, and elastic modulus of 2.35-3 GPa.

Effectiveness on weight reduction: the weight of the cover plate (length×width×thickness×2.4 g/cm$^3$)+the weight of the MS or PMMA light guide plate (length×width×thickness×1.42 g/cm$^3$ or 1.18 g/cm$^3$)−the weight of the glass light guide plate (length×width×thickness×2.4 g/cm$^3$). Taking 65 inches as an example, when the thickness of the cover plate is 7 mm and the thickness of the PMMA light guide plate is 2 mm, for the calculation convenience, the lengths and widths of the cover plate and the light guide plate are set to be the same, the weight is reduced by (the weight of the cover plate+the weight of the PMMA light guide plate−the weight of the glass light guide plate)/(the weight of the cover plate+the weight of the PMMA light guide plate)=1.436×the length×the width/1.916×the length×the width=74.9%, or the weight of the new structure is 25.1% of the weight of the conventional structure.

With regard to the effectiveness of thinning the structure, there is no difference between the bottom emitting backlight and the side emitting backlight; the typical thickness of the cover plate generally ranges from 2 mm to 10 mm, and the thickness of the optical adhesive layer generally is 0.3 mm. The thickness of the structure can be reduced by 2.3 mm~10.3 mm.

In the embodiment of the present disclosure, at least the following advantageous effects can be achieved.

1. In the display panel 100, the first polarizer 110 arranged at the light-emitting side of the display panel 100 is made of a material with a pencil hardness of being not less than 3H and not greater than 9H, and has relatively excellent mechanical properties, so that the first polarizer 110 can provide the display panel 100 with sufficient anti-scratch protection to prevent the display element in the display panel 100 from being damaged by scratches, and the first polarizer 110 can also provide the display panel 100 with a certain strength of support to reduce the probability of the display panel 100 being damaged by bending or even breaking.

2. In the display panel 100 using the LCD display structure, the diffusion plate 142 or the light guide plate 144 in the backlight assembly 140 is made of the material with the elastic modulus of not less than 68 GPa, so that the diffusion plate 142 or the light guide plate 144 has a certain strength, and can provide a certain strength support for the whole display panel 100, so as to reduce the probability of the display panel 100 being damaged by bending or even breaking, and can effectively extend the service life of the display panel.

3. In the touch display panel 200, the first polarizer 110 having a pencil hardness of being not less than 3H and not greater than 9H is used at the light-emitting side of the structure of the display panel 100 in the touch display panel 200, so that the first polarizer 110 can provide the display panel 100 with sufficient anti-scratch protection to prevent the display element in the display panel 100 from being damaged by scratches, and the first polarizer 110 can also provide the display panel 100 with the certain strength of support to reduce the probability of the display panel 100 being damaged by bending or even breaking.

4. In the touch display panel 200, with the help of the first polarizer 110, the display panel 100 is beneficial to realize a structure without the conventional cover plate, and in this way, the cover plate structure can be omitted, thereby promoting the development of light and thin touch display products, and enabling a display image to be displayed at a location closer to the surface of the touch display product, facilitating the reduction or elimination of the dislocation between the actual display position and the visual sensory position, and further facilitating the reduction or elimination of the dislocation between the touch point and the display point, so as to improve the touch accuracy; it is also possible to eliminate the bonding process between the cover plate and the display device or the touch device, to avoid the problem of light leakage during bonding and to save the bonding cost.

It will be understood by those skilled in the art that in the description of the present disclosure, the orientation or positional relationship indicated by the terms "center", "upper", "lower", "front", "rear", "left", "right", "vertical", "horizontal", "top", "bottom", "inner", "outer", and the like is based on the orientation or positional relationship shown in the drawings, and is merely for convenience of describing the disclosure and simplifying the description, but not intended or implied that the referenced device or element must have a particular orientation, be constructed and operated in a particular orientation, and thus should not be construed as limiting the present disclosure.

The terms "first" and "second" are used for descriptive purposes only and are not to be construed as indicating or implying relative importance or implicitly indicating the number of technical features indicated. Therefore, a feature defined by "first" and "second" may explicitly or implicitly indicate inclusion of one or more such features. In the description of the present disclosure, the meaning of "a plurality of" is two or more, unless otherwise specified.

In the description of the present disclosure, it should be noted that the terms "mount", "connect" and "connected" are to be construed broadly, e.g. may be fixedly connected, removably connected, or integrally connected, may be a direct connection or an indirect connection through an intermediate medium, or a communication between two elements, unless explicitly otherwise stated or defined. The specific meanings of the above terms in the present disclosure will be understood on a case-by-case basis by those of ordinary skill in the art.

In the description of the present disclosure, particular features, structures, materials, or characteristics can be combined in any suitable manner in any one or more embodiments or examples.

While the foregoing is only part of embodiments of the present disclosure, it should be understood by those skilled in the art that various improvements and modifications may be made without departing from the principle of the present disclosure, and these improvements and modifications shall also fall within the scope of protection of the present disclosure.

What is claimed is:

1. A touch display panel, comprising: a touch panel, and a display panel; wherein
the display panel comprises: a first polarizer, a liquid crystal cell, a second polarizer, and a backlight assembly,
a material of the first polarizer comprises polyurethane, a pencil hardness of the first polarizer is not less than 3 H and not greater than 9 H, the polyurethane is obtained by coating or spraying and curing on the first polarizer;
the first polarizer is arranged at a side of the liquid crystal cell distal to the backlight assembly,
the second polarizer is arranged between the backlight assembly and the liquid crystal cell, the backlight assembly, the second polarizer, and the liquid crystal cell are laminated one on another in that order,
wherein the backlight assembly comprises: a first light source and a diffusion plate; the diffusion plate is arranged at a side of the second polarizer distal to the liquid crystal cell; the first light source is arranged at a side of the diffusion plate distal to the second polarizer; and elastic modulus of the diffusion plate is not less than 68 GPa, the diffusion plate is made of a material, a light transmittance of the material is not less than 90%, a density of the material is not less than 2.0 g/cm$^3$, and/or
the backlight assembly comprises: a second light source and a light guide plate; the second light source is arranged at an end of the light guide plate; the light guide plate is arranged at a side of the second polarizer distal to the liquid crystal cell; and elastic modulus of the light guide plate is not less than 68 GPa, the light guide plate is made of a material, a light transmittance of the material is not less than 90%, a density of the material is not less than 2.0 g/cm³, the touch panel is arranged between a liquid crystal cell in the display panel and the second polarizer.

2. The touch display panel according to claim 1, wherein elastic modulus of the material of the diffusion plate is not less than 55 GPa.

3. The touch display panel according to claim 2, wherein the diffusion plate is made of sapphire or glass.

4. The touch display panel according to claim 1, wherein elastic modulus of the material of the light guide plate is not less than 55 GPa.

5. The touch display panel according to claim 4, wherein the light guide plate is made of sapphire or glass.

6. The touch display panel according to claim 1, further comprising: an anode layer, a light-emitting layer, and a cathode layer laminated one on another in that order in a direction approaching the first polarizer;

the first polarizer is arranged at a side of the cathode layer distal to the light-emitting layer.

7. A display device, comprising: a back plate, and the touch display panel according to claim 1.

* * * * *